US011159199B2

(12) United States Patent
Takeda et al.

(10) Patent No.: US 11,159,199 B2
(45) Date of Patent: Oct. 26, 2021

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/644,778

(22) PCT Filed: Sep. 7, 2017

(86) PCT No.: PCT/JP2017/032326
§ 371 (c)(1),
(2) Date: Mar. 5, 2020

(87) PCT Pub. No.: WO2019/049283
PCT Pub. Date: Mar. 14, 2019

(65) Prior Publication Data
US 2021/0067194 A1 Mar. 4, 2021

(51) Int. Cl.
H04B 1/00 (2006.01)
H04B 1/713 (2011.01)
(Continued)

(52) U.S. Cl.
CPC ........... *H04B 1/713* (2013.01); *H04L 5/0007* (2013.01); *H04W 72/0446* (2013.01); *H04W 72/0453* (2013.01); *H04W 72/1289* (2013.01)

(58) Field of Classification Search
CPC .. H04B 1/713; H04L 5/0007; H04W 72/0446; H04W 72/0453; H04W 72/1289
(Continued)

(56) References Cited

U.S. PATENT DOCUMENTS

2009/0147748 A1 6/2009 Ofuji et al.
2011/0092240 A1 4/2011 Aiba et al.
(Continued)

FOREIGN PATENT DOCUMENTS

EP 2448158 A2 5/2012
JP 2007-151059 A 6/2007
(Continued)

OTHER PUBLICATIONS

International Search Report issued in PCT/JP2017/032326 dated Nov. 21, 2017 (2 pages).
(Continued)

*Primary Examiner* — Zewdu A Kassa
(74) *Attorney, Agent, or Firm* — Osha Bergman Watanabe & Burton LLP

(57) ABSTRACT

A terminal is disclosed including a processor that determines an offset for a second frequency hop in a frequency hopping on an uplink shared channel based on an uplink Bandwidth Part (UL BWP) configuration; and a transmitter that transmits the uplink shared channel, wherein the UL BWP configuration includes information indicating a number of physical resource blocks (PRBs) in the UL BWP. In other aspects, a base station and a radio communication method for a terminal are also disclosed.

16 Claims, 12 Drawing Sheets

(51) Int. Cl.
*H04L 5/00* (2006.01)
*H04W 72/04* (2009.01)
*H04W 72/12* (2009.01)

(58) Field of Classification Search
USPC ....... 375/133, 132, 131, 130, 219, 295, 316, 375/370
See application file for complete search history.

(56) References Cited

U.S. PATENT DOCUMENTS

| 2011/0243190 | A1 | 10/2011 | Nagata et al. | |
|---|---|---|---|---|
| 2019/0036665 | A1* | 1/2019 | Park | H04L 5/0051 |
| 2020/0059390 | A1* | 2/2020 | Zhang | H04L 1/0004 |

FOREIGN PATENT DOCUMENTS

| JP | 2009/128285 A1 | 10/2009 |
|---|---|---|
| JP | 2010-074798 A | 4/2010 |

OTHER PUBLICATIONS

Written Opinion of the International Searching Authority issued in PCT/JP2017/032326 dated Nov. 21, 2017 (4 pages).
3GPP TS 36300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Extended European Search Report issued in Application No. 17924417.3, dated Mar. 12, 2021 (7 pages).
Office Action issued in Chinese Application No. 201780094724.9; dated May 10, 2021 (21 pages).
Office Action issued in the counterpart Korean Patent Application No. 10-2020-7008475, dated May 31, 2021 (10 pages).
NTT Docomo, Inc.; "Frequency-domain resource allocation"; 3GPP TSG RAN WG1 Meeting #90, R1-1713948 Prague, Czechia; Aug. 21-25, 2017 (6 pages).
Samsung; "DL/UL Frequency Resource Allocation"; 3GPP TSG RAN WG1 Meeting NR Ad-Hoc, R1-1710718 Qingdao, China; Jun. 27-30, 2017 (7 pages).

* cited by examiner

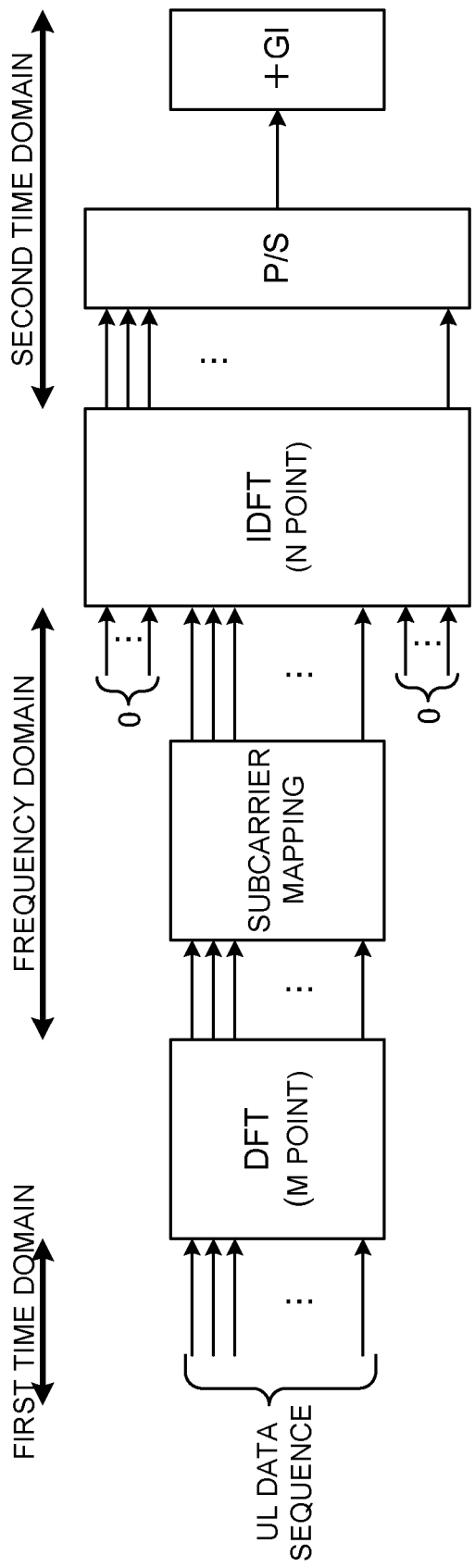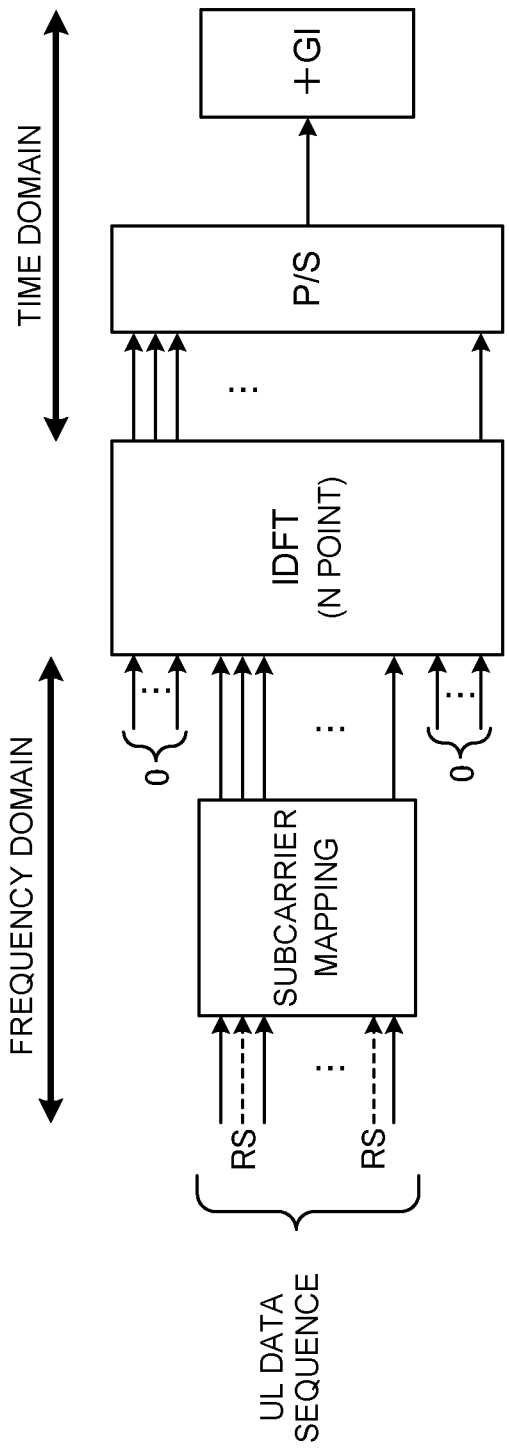
FIG. 1A
FIG. 1B

USER TERMINAL AND RADIO COMMUNICATION METHOD

TECHNICAL FIELD

The present invention relates to a user terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for the purpose of wider bands and a higher speed than LTE, LTE successor systems (also referred to as, for example, LTE Advanced (LTE-A), Future Radio Access (FRA), 4G, 5G, 5G+ (plus), New-RAT (NR), and LTE Rel. 14, 15 and subsequent releases) have been also studied.

On Uplink (UL) of legacy LTE systems (e.g., LTE Rel. 8 to 13), DFT-spread-OFDM (DFT-s-OFDM: Discrete Fourier Transform-Spread-Orthogonal Frequency Division Multiplexing) waveform is supported. The DFT-spread-OFDM waveform is a single carrier waveform, and therefore can prevent an increase in a Peak to Average Power Ratio (PAPR).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

It has been studied to support a DFT-spread-OFDM waveform that is a single carrier waveform and, in addition, a Cyclic Prefix-OFDM (CP-OFDM: Cyclic Prefix-Orthogonal Frequency Division Multiplexing) waveform on Uplink (UL) of future radio communication systems (e.g., LTE 5G and NR). In addition, a DFT-spread-OFDM waveform can be paraphrased as a UL signal to which DFT-spreading (also referred to as DFT precoding) is applied (with DFT-spreading), and a CP-OFDM waveform can be paraphrased as a UL signal to which DFT-spreading is not applied (without DFT-spreading).

Thus, there is a risk that, when transmission of a UL signal (e.g., UL data and/or uplink control information) on a UL data channel (a UL shared channel such as a PUSCH: Physical Uplink Shared Channel) is controlled on UL in the future radio communication systems that support a CP-OFDM waveform, the UL signal cannot be appropriately transmitted. When, for example, an intermodulation distortion occurs or a frequency diversity effect cannot be obtained, there is a risk that communication quality deteriorates.

The present invention has been made in light of this point, and one of objects of the present invention is to provide a user terminal and a radio communication method that appropriately transmit a UL signal having a multicarrier waveform.

Solution to Problem

One aspect of a user terminal according to the present invention includes: a transmission section that transmits an uplink signal by using an uplink shared channel, the uplink signal having a multicarrier waveform over contiguous frequency resources; and a control section that controls frequency hopping of the uplink signal.

Advantageous Effects of Invention

According to the present invention, it is possible to appropriately transmit a UL signal having a multicarrier waveform.

BRIEF DESCRIPTION OF DRAWINGS

FIGS. 1A and 1B are diagrams illustrating one example of a PUSCH transmitter of a future radio communication system.

DESCRIPTION OF EMBODIMENTS

It has been studied to support a DFT-spread-OFDM waveform that is a single carrier waveform (a UL signal to which DFT-spreading is applied) and, in addition, a Cyclic Prefix OFDM (CP-OFDM) waveform (a UL signal to which DFT-spreading is not applied) on UL of future radio communication systems.

Whether or not DFT-spreading is applied to a PUSCH (NR-PUSCH) (which one of a DFT-spread-OFDM and a CP-OFDM waveform is used) is assumed to be configured or indicated to a user terminal (User Equipment: UE) by a network (e.g., radio base station).

FIGS. 1A and 1B are diagrams illustrating one example of a transmitter of a PUSCH in the future radio communication system. FIG. 1A illustrates one example of the transmitter that uses a DFT-spread-OFDM waveform. As illustrated in FIG. 1A, an encoded and modulated UL data sequence is input to an M-point Discrete Fourier Transform (DFT) (or FFT: Fast Fourier Transform), and is converted from a first time domain into a frequency domain. An output from the DFT is mapped on M subcarriers, is input to an N-point Inverse Discrete Fourier Transform (IDFT: Inverse Discrete Fourier Transform) (or IFFT: Inverse Fast Fourier Transform), and is converted from the frequency domain into a second time domain.

In this regard, N>M holds, and input information to an unused IDFT (or the IFFT) is configured to zero. Thus, the output of the IDFT becomes a signal whose instantaneous power fluctuation is small and whose bandwidth depends on M. The output of the IDFT is subjected to parallel/serial (P/S) conversion, and is added a Guard Interval (GI) (also referred to as a Cyclic Prefix (CP)). Thus, the DFT-spread-OFDM transmitter generates a signal having single carrier characteristics, and transmits the signal in one symbol.

FIG. 1B illustrates one example of a transmitter that uses a CP-OFDM waveform. As illustrated in FIG. 1B, an encoded and modulated UL data sequence and/or a Reference Signal (RS) are mapped on subcarriers the number of which is equal to a transmission bandwidth, and is input to the IDFT (or the IFFT). Input information to an unused IDFT is configured to zero. The output from the IDFT is subjected to P/S conversion, and a GI is inserted in the output. Thus, the CP-OFDM transmitter uses a multicarrier, and consequently can perform frequency division multiplexing on the RS and the UL data sequence.

Furthermore, the future radio communication systems are assumed to support allocation of one or contiguous resource units (e.g., Resource Blocks (RBs)) (contiguous RB allocation or contiguous frequency resource allocation) and/or application of frequency hopping for PUSCH transmission to which the DFT-spread-OFDM waveform is applied. For example, the user terminal allocates a UL signal (e.g., PUSCH signal) to one or plurality of contiguous RBs, applies (or does not apply) frequency hopping to the UL signal, and transmits the UL signal.

Figure 2:
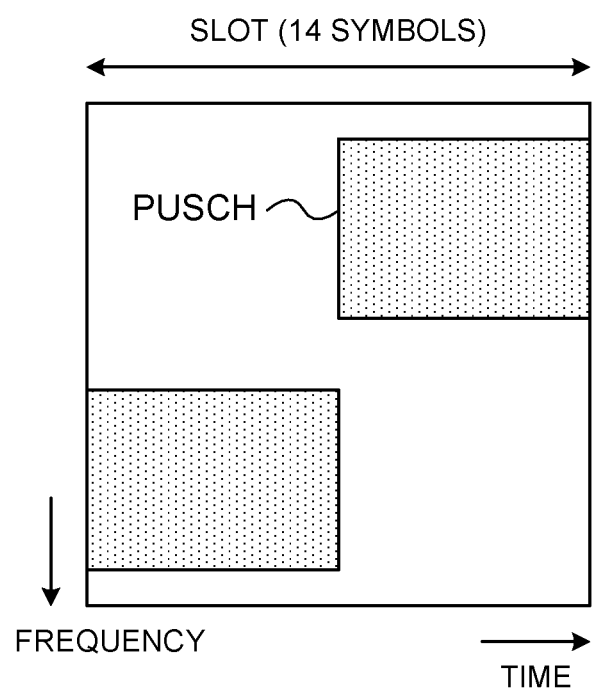
FIG. 2 is a diagram illustrating one example of intra-slot frequency hopping.

When frequency hopping is applied, a UL signal is assumed to be arranged in a different frequency domain in a given time unit (e.g., a slot or a mini slot) of UL transmission. When, for example, one slot includes 14 symbols as illustrated in FIG. 2, the UL signal is allocated to different frequency domains in part of symbols (e.g., seven symbols of a first half) and other symbols (e.g., seven symbols of a second half).

It has been studied to support contiguous RB allocation that is accompanied by frequency hopping or is not accompanied by frequency hopping for DFT-spread-OFDM-based NR-PUSCH transmission. Furthermore, it has been studied to support at least intra-slot frequency hopping for 14 symbol slots. Frequency hopping can obtain a frequency diversity gain, and can expand a coverage.

On the other hand, the CP-OFDM waveform enables non-contiguous RB allocation (non-contiguous frequency resource allocation), and makes it possible to obtain the frequency diversity gain by dispersing the non-contiguous RB allocation in frequency domains, and therefore an effect of frequency hopping that uses the CP-OFDM waveform is considered to be questionable. However, non-contiguous RB allocation causes a high Intermodulation Distortion (IMD), and therefore a power back-off needs to be made very high. As a result, non-contiguous RB allocation needs to lower transmission power, and a coverage is reduced. Hence, it is considered that non-contiguous RB allocation is not actually used for the CP-OFDM waveform, too. When non-contiguous RB allocation is not used, the frequency diversity cannot be obtained, and therefore the coverage cannot be expanded.

Hence, the inventors have conceived using a CP-OFDM waveform for transmission of UL data, and using contiguous RB allocation and frequency hopping.

The present embodiment will be described below. Hereinafter, a CP-OFDM waveform will be exemplified as one example of a multicarrier waveform, and a DFT-spread-OFDM waveform will be exemplified as one example of a single carrier waveform. However, the present embodiment is applicable to multicarrier waveforms other than the CP-OFDM waveform, and single carrier waveforms other than the DFT-spread-OFDM waveform, too. Furthermore, the single carrier waveform can be paraphrased as that DFT-spreading is applied, and the multicarrier waveform can be paraphrased as that DFT-spreading is not applied.

First Embodiment

The first embodiment supports contiguous RB allocations that is accompanied by frequency hopping or is not accompanied by frequency hopping for CP-OFDM-based NR-PUSCH transmission. That is, a UL signal of a PUSCH has a CP-OFDM waveform over contiguous frequency resources.

As illustrated in FIG. 2, in a case of a 14-symbol slot, at least intra-slot frequency hopping may be supported. For example, the UE transmits the PUSCH by using a first frequency resource (a first band and a first frequency hop) in seven symbols of the first half in a slot using the first band, and transmits the PUSCH by using a second frequency resource (a second band and a second frequency hop) different from the first frequency resource in seven symbols of the second half. A time duration (the number of symbols) in which the first frequency resource is used, and a time duration (the number of symbols) in which the second frequency resource is used may be different from each other. Furthermore, a Demodulation Reference Signal (DMRS) may be multiplexed (time division multiplexing) on a head or other symbol in each frequency hop.

A radio base station notifies a UE of an instruction for activating or deactivating frequency hopping independently from information indicating which one of a DFT-spread-OFDM waveform and a CP-OFDM waveform is used for PUSCH transmission. Irrespectively of, for example, whether a waveform of UL transmission is the DFT-spread-OFDM waveform or the CP-OFDM waveform, the UE receives the instruction for activating or deactivating frequency hopping via higher layer signaling (e.g., RRC signaling).

Information indicating whether frequency hopping is activated or deactivated may be decided by the UE based on physical layer signaling. For example, the UE may make decision based on a specific field value including one or more bits included in a PDCCH (UL grant) for scheduling an NR-PUSCH, may make decision based on a Downlink Control Information (DCI) format (a payload or a transmission mode) of the UL grant, or may make decision based on a configuration of a control channel (a search space or a Control Resource Set (CORESET)) in which the UL grant has been received. The CORESET is a frame (that is also alternatively referred to as a box, a set or a mass) of a resource in which DL control information is mapped, or a time resource and/or a frequency resource in which the NR-PDCCH is arranged.

Positions and the number of DMRSs to be multiplexed on the NR-PUSCH may differ according to whether or not frequency hopping is activated or deactivated.

By using the CP-OFDM waveform and contiguous RB allocation for PUSCH transmission, the UE can increase the IMD and prevent reduction of the coverage. Furthermore, by using frequency hopping for CP-OFDM-based NR-PUSCH transmission, it is possible to obtain the frequency diversity gain, and expand the coverage.

Second Embodiment

According to the second embodiment, in a case where intra-TTI frequency hopping is used for PUSCH transmission, non-frequency-first/time-second mapping is applied as a data mapping order of both of a DFT-spread-OFDM waveform and a CP-OFDM waveform. In addition, frequency-first/time-second mapping refers to performing mapping on time/frequency resources allocated to a PUSCH in a frequency direction first and in a time direction secondly.

Legacy LTE systems (e.g., LTE Rel. 13 and prior releases) are applied Code block segmentation of dividing a Transport Block (TB) that is a DL data scheduling unit into one or more Code Blocks (CB), and independently encoding each CB. An encoded bit of each CB is coupled (for example, coupled as a Code Word (CW)), is modulated, and mapped on an available radio resource (e.g., a Resource Element (RE)) in the frequency direction first and the time direction secondly (frequency-first/time-second) on the PDSCH. On the PUSCH of LTE that uses the DFT-spread-OFDM waveform, the encoded bit is subjected to the same processing as that of the PDSCH, and then is interleaved in two dimensions of the time and the frequency before being mapped on a radio resource. Thus, the encoded bit is mapped in the time direction first and the frequency direction secondly (time-first/frequency-second) on the PUSCH.

It is important that each Code Block (CB) that composes a Transport Block (TB) is dispersed over one or more frequency hoppings to obtain an appropriate frequency diversity gain by intra-TTI frequency hopping on the PUSCH of NR, too.

Hence, on the NR-PUSCH, for example, a data mapping order may be time-first/frequency-second. According to time-first/frequency-second mapping, mapping is performed on time/frequency resources allocated to the PUSCH in the time direction first and the frequency direction secondly.

If non-contiguous RB allocation is used for the CP-OFDM waveform, it is possible to obtain the frequency diversity gain by dispersing and arranging the NR-PUSCH on different RBs and performing frequency-first/time-second mapping. However, as described above, non-contiguous RB allocation causes a high IMD, and needs to lower transmission power. Hence, in a case of not only the DFT-spread-OFDM waveform but also the CP-OFDM waveform, it is possible to prevent the high IMD by arranging the NR-PDSCH on a local RB by using contiguous RB allocation, and obtain the frequency diversity gain by using frequency hopping and time-first/frequency-second mapping.

In addition, intra-TTI frequency hopping may be, for example, intra-slot frequency hopping or may be intra-mini-slot frequency hopping.

Figure 3:
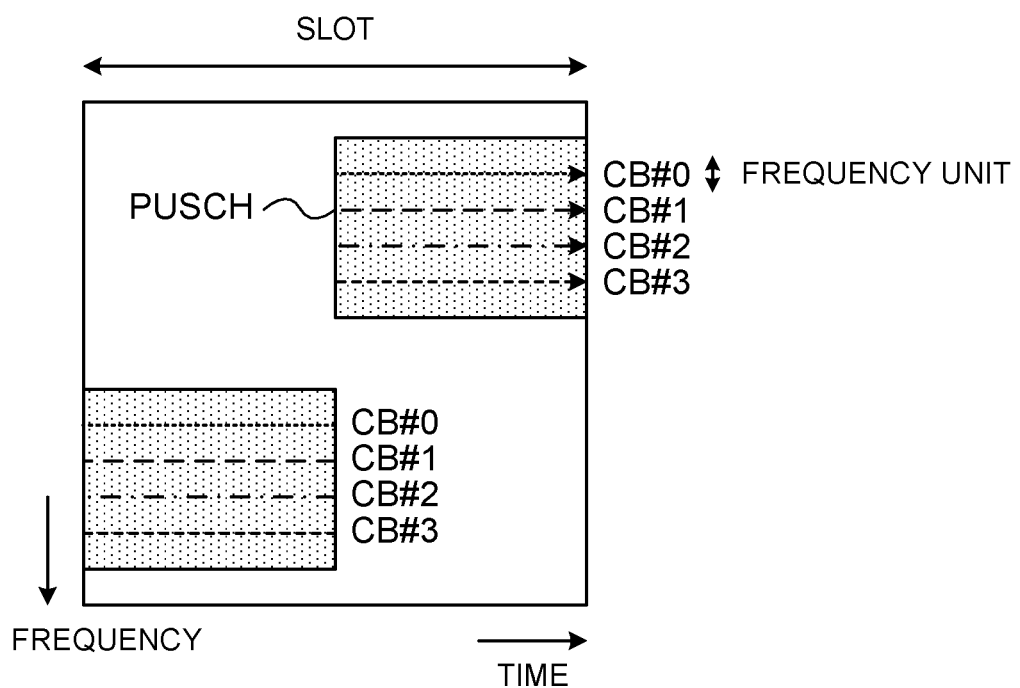
FIG. 3 is a diagram illustrating one example of time-first/frequency-second mapping.

As illustrated in FIG. 3, the UE maps the first CB in the time direction in a first frequency time of resources allocated to the PUSCH. Subsequently, the UE maps the next CB in the time direction in the next frequency unit. The frequency unit may be one or more REs or may be one or more RBs. According to this operation, each CB is mapped over TTIs (slots in this example), and is applied frequency hopping.

Furthermore, when UL transmission is performed by using a plurality of layers, a mapping order may be layer-time-frequency, or may be time-layer-frequency. That is, the UE may perform mapping at least preferentially in the time direction over the frequency direction.

According to the above second embodiment, the UE can give a frequency diversity to all CBs by dispersing and arranging each CB to and on a plurality of frequencies.

Third Embodiment

According to the third embodiment, NR may support plural TTI transmission. For example, a UE transmits one TB by using a plurality of TTIs (slots or mini slots).

One of following options may be used for plural TTI transmission.

Option 1: The UE performs frequency hopping in each TTI of a plurality of TTIs. The same frequency hopping as that of one TTI transmission is applied to a certain TTI.

Figure 4A:
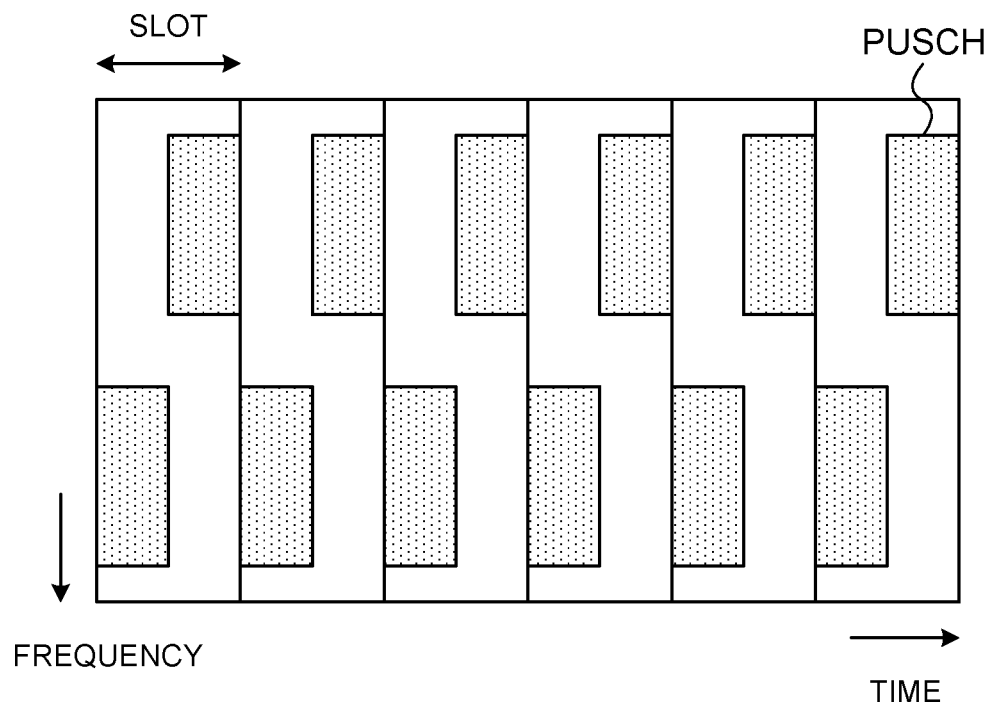
FIGS. 4A and 4B are diagrams illustrating one example of frequency hopping over a plurality of TTIs.

As illustrated in, for example, FIG. 4A, the UE may perform frequency hopping in each TTI of PUSCH transmission of six TTIs (slots in this example) for transmitting one TB.

The option 2: The UE performs frequency hopping over a plurality of TTIs. Frequency hopping may be applied or may not be applied to a certain TTI.

Figure 4B:
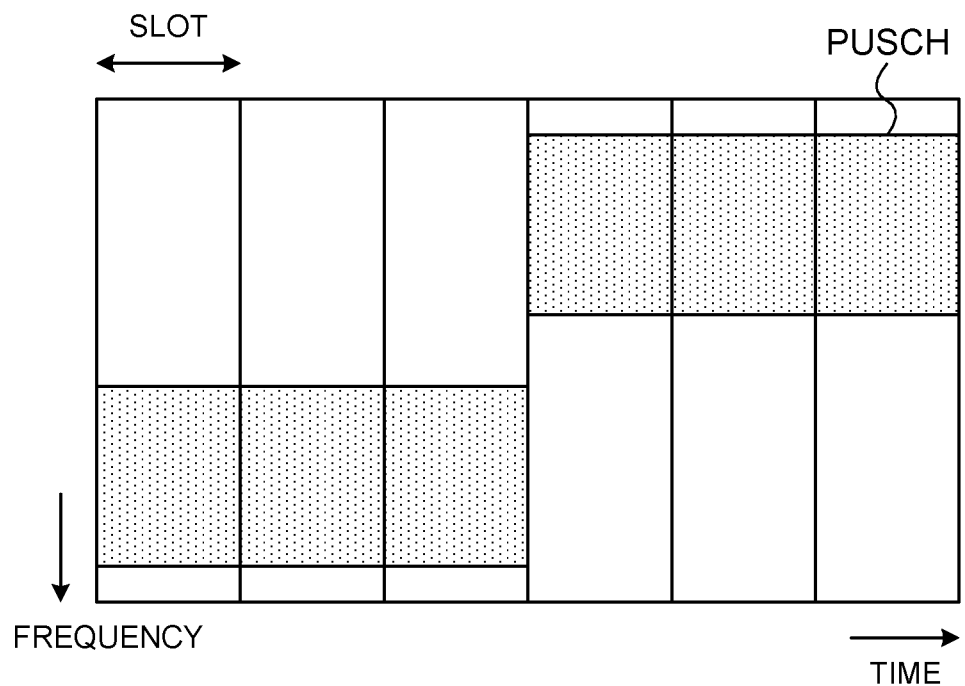

As illustrated in, for example, FIG. 4B, the UE may groups PUSCH transmission of six TTIs (slots in this example) for transmitting one TB into a group of three TTIs of a first half and a group of three TTIs of a second half, and perform frequency hopping between these groups. The number of groups may be three or more. The number of TTIs in each group may not be identical.

Furthermore, the UE may perform inter-TTI frequency hopping.

According to the above third embodiment, even when the TTI length is short and/or when the TB length is long, it is possible to obtain a frequency diversity gain.

Fourth Embodiment

According to the fourth embodiment, higher layer signaling (e.g., a Radio Resource Control (RRC) signaling) configures a hopping pattern or a hopping offset to a UE.

Figure 5:
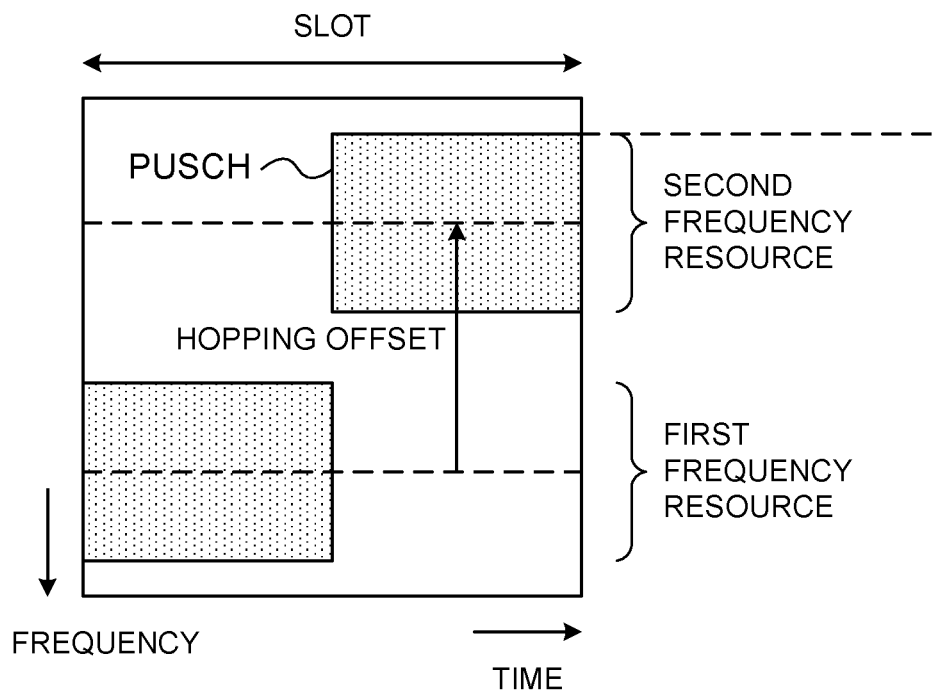
FIG. 5 is a diagram illustrating one example of a second frequency resource determining method based on a hopping offset.

As illustrated in FIG. 5, the hopping offset indicates, for example, an offset of a second frequency resource (a second band and a second frequency hop) that is a transition destination frequency resource with respect to a first frequency resource (a first band and a first frequency hop) that is a transition destination source frequency source of frequency hopping. A hopping pattern may indicate a transition destination time resource and/or frequency resource. The UE may determine the second frequency resource based on the hopping pattern or the hopping offset.

It has been studied for NR to apply UL grant-based transmission for transmitting UL data based on a UL grant and, in addition, UL grant-free transmission for transmitting UL data without the UL grant to realize low latency communication.

According to UL grant-based transmission, a radio base station (that may be referred to as, for example, a Base Station (BS), a Transmission/Reception Point (TRP), an eNode B (eNB) or a gNB (NR NodeB)) transmits a downlink control channel (UL grant) for instructing allocation of UL data (PUSCH: Physical Uplink Shared Channel), and the UE transmits UL data according to the UL grant.

On the other hand, according to UL grant-free transmission, the UE transmits UL data without receiving the UL grant for scheduling data.

Physical layer (L1: Layer 1) signaling (e.g., PDCCH (Physical Downlink Control Channel)) for activating UL grant-free transmission has been also studied.

Some types of control of UL grant-free transmission have been studied. For example, according to a type 1, UL grant-free transmission does not use L1 signaling based only on a Radio Resource Control (RRC) configuration. According to a type 2, UL grant-free transmission is based on both of the RRC configuration and activation/deactivation of L1 signaling.

The UL grant may indicate the first frequency resource to UL grant-based transmission. The UE may determine the first frequency resource based on the UL grant, and determine the second frequency resource based on a hopping pattern or a hopping offset configured by higher layer signaling.

For type 2 UL grant-free transmission, L1 signaling for activating UL grant-free transmission may indicate the first frequency resource. The UE may determine the first frequency resource based on this L1 signaling, and determine the second frequency resource based on the hopping pattern or the hopping offset configured by higher layer signaling.

For type 1 UL grant-free transmission, RRC signaling may indicate the first frequency resource. The UE may determine the first frequency resource based on this RRC signaling, and determine the second frequency resource based on the hopping pattern or the hopping offset configured by higher layer signaling.

The hopping pattern or the hopping offset may be information related to a plurality of transition destination frequency resources of a plurality of frequency hoppings. The UE may determine a plurality of transition destination frequency resources (the second frequency resource and the third frequency resource) based on the hopping pattern or the hopping offset.

According to the above fourth embodiment, the UE can control frequency hopping of a PUSCH based on a notification of the hopping pattern or the hopping offset.

Fifth Embodiment

According to the fifth embodiment, a hopping pattern or a hopping offset can be obtained from a UL Bandwidth Part (BWP, partial band) configuration.

It has been studied for future radio communication systems (e.g., NR, 5G or 5G+) to allocate a carrier (a Component Carrier (CC) or a system band) of a wider bandwidth (e.g., 100 to 400 MHz) than those of legacy LTE systems (e.g., LTE Rel. 8 to 13). There is a risk that, when a user terminal uses the entire carrier at all times, power consumption becomes enormous. Hence, it has been studied for the future radio communication systems to semi-statically configure one or more frequency bands in the carrier to a user terminal. Each frequency band in the carrier will be also referred to as a BWP.

A BWP configuration may include at least one of information indicating numerologies (e.g., subcarrier spacing), information indicating a frequency position (e.g., a PRB index of a center frequency, a center PRB or a minimum frequency), information indicating a bandwidth (e.g., the number of Resource Blocks (also referred to as RBs or Physical RBs (PRBs)), information a time resource (e.g., a slot (mini slot) index, a periodicity or the number of symbols per slot (mini slot)), information indicating the number of layers of MIMO, and information related to Quasi-Co-Location.

The UE may receive a BWP configuration by using higher layer signaling (e.g., RRC signaling and broadcast information (Master Information Block (MIB) or a System information Block (SIB)) and/or MAC signaling).

A BWP for UL may be referred to as a UL BWP. Information for configuring the UL BWP may be referred to as a UL BWP configuration.

When the UL BWP is configured, the UE may determine the transition source first frequency resource of frequency hopping of UL grant-free transmission based on physical layer signaling or higher layer signaling, and determine the transition destination second frequency resource based on the UL BWP configuration.

The UL BWP configuration may include at least one of the center frequency (e.g., PRB index) of the UL BWP, the minimum frequency (e.g., PRB index) of the UL BWP, and the bandwidth (e.g., the number of PRBs) of the UL BWP. The UE may determine the second frequency resource based on the first frequency resource, the UL BWP configuration and a rule configured in advance.

Figure 6A:
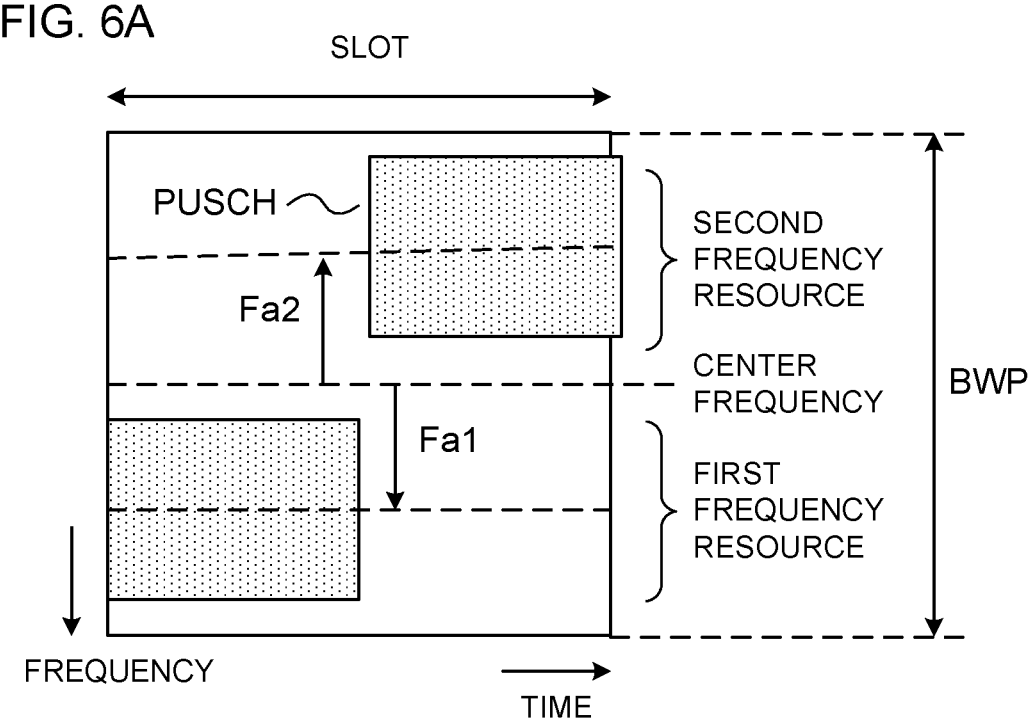
FIGS. 6A and 6B are diagrams illustrating one example of a second frequency resource determining method based on a UL BWP configuration.
Figure 6B:
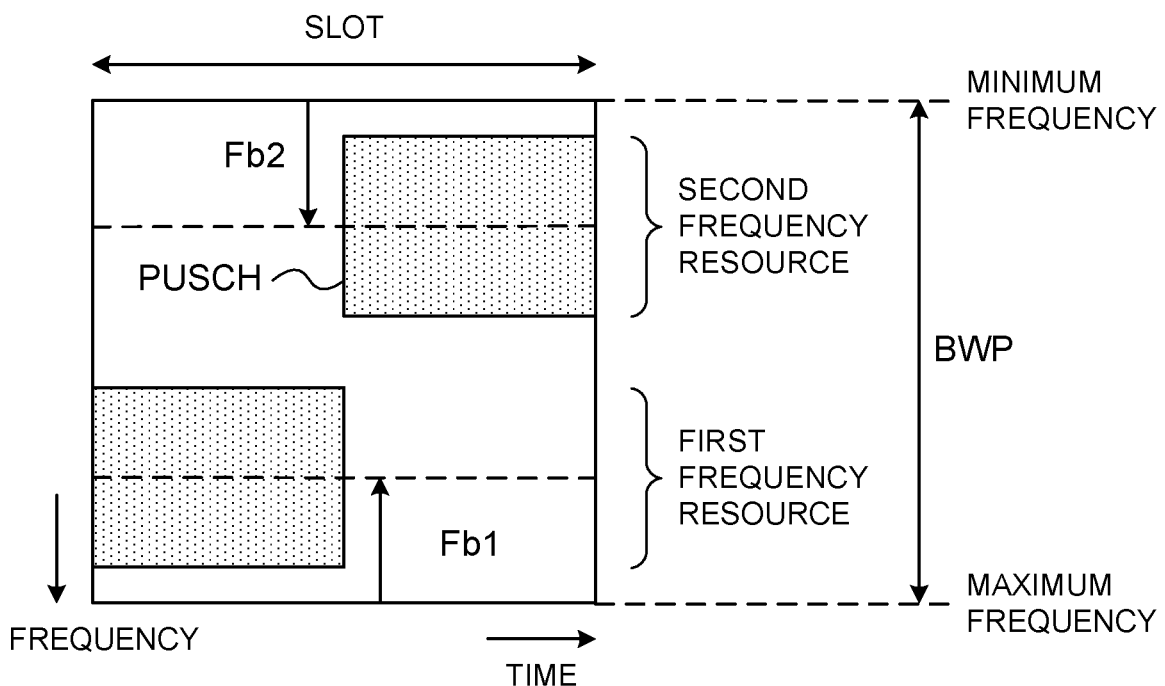

As illustrated in FIG. 6A, the UE may determine the second frequency resource from the first frequency resource according to a rule that the first frequency resource and the second frequency resource are at symmetrical positions with respect to a specific frequency (e.g., carrier center frequency) (e.g., a distance Fa1 from the center frequency to the center of the first frequency resource, and a distance Fa2 from the center frequency to the center of the second frequency resource are equal, and the second frequency resource is located on a side opposite to the first frequency resource with respect to the center frequency). Furthermore, as illustrated in FIG. 6B, the UE may determine the second frequency resource from the first frequency resource by using the minimum frequency and the bandwidth of the UL BWP according to a rule that a distance Fb1 from the minimum frequency of the UL BWP to the center of the first frequency resource, and a distance Fb2 from a maximum frequency of the UL BWP to the second frequency resource are equal.

For UL grant-based transmission, a UL grant may indicate the first frequency resource. The UE may determine the first frequency resource based on the UL grant, and determine the second frequency resource based on the UL BWP configuration.

For type 2 UL grant-free transmission, Layer 1 (L1 or a physical layer) signaling for activating UL grant-free transmission may indicate the first frequency resource. The UE may determine the first frequency resource based on this L1 signaling, and determine the second frequency resource based on the UL BWP configuration.

For type 1 UL grant-free transmission, RRC signaling may indicate the first frequency resource. The UE may determine the first frequency resource based on this RRC signaling, and determine the second frequency resource based on the UL BWP configuration.

The UE may determine a plurality of transition destination frequency resources of a plurality of frequency hoppings based on the first frequency resource of frequency hopping of UL grant-free transmission, the UL BWP configuration and the rule configured in advance.

The UE may perform frequency hopping according to the fourth embodiment when the UL BWP is not configured. The UE may perform frequency hopping according to the fifth embodiment when the UL BWP is configured.

According to the above fifth embodiment, the UE can control frequency hopping of the PUSCH based on the UL BWP information. Furthermore, it is not necessary to notify the hopping pattern or the hopping offset from the radio base station to the UE, so that it is possible to suppress an overhead of a notification from the radio base station to the UE.

(Radio Communication System)

The configuration of the radio communication system according to the present embodiment will be described below. This radio communication system is applied the radio communication method according to each of the above embodiments. In addition, the radio communication method according to each of the above embodiments may be applied alone or may be applied in combination.

Figure 7:
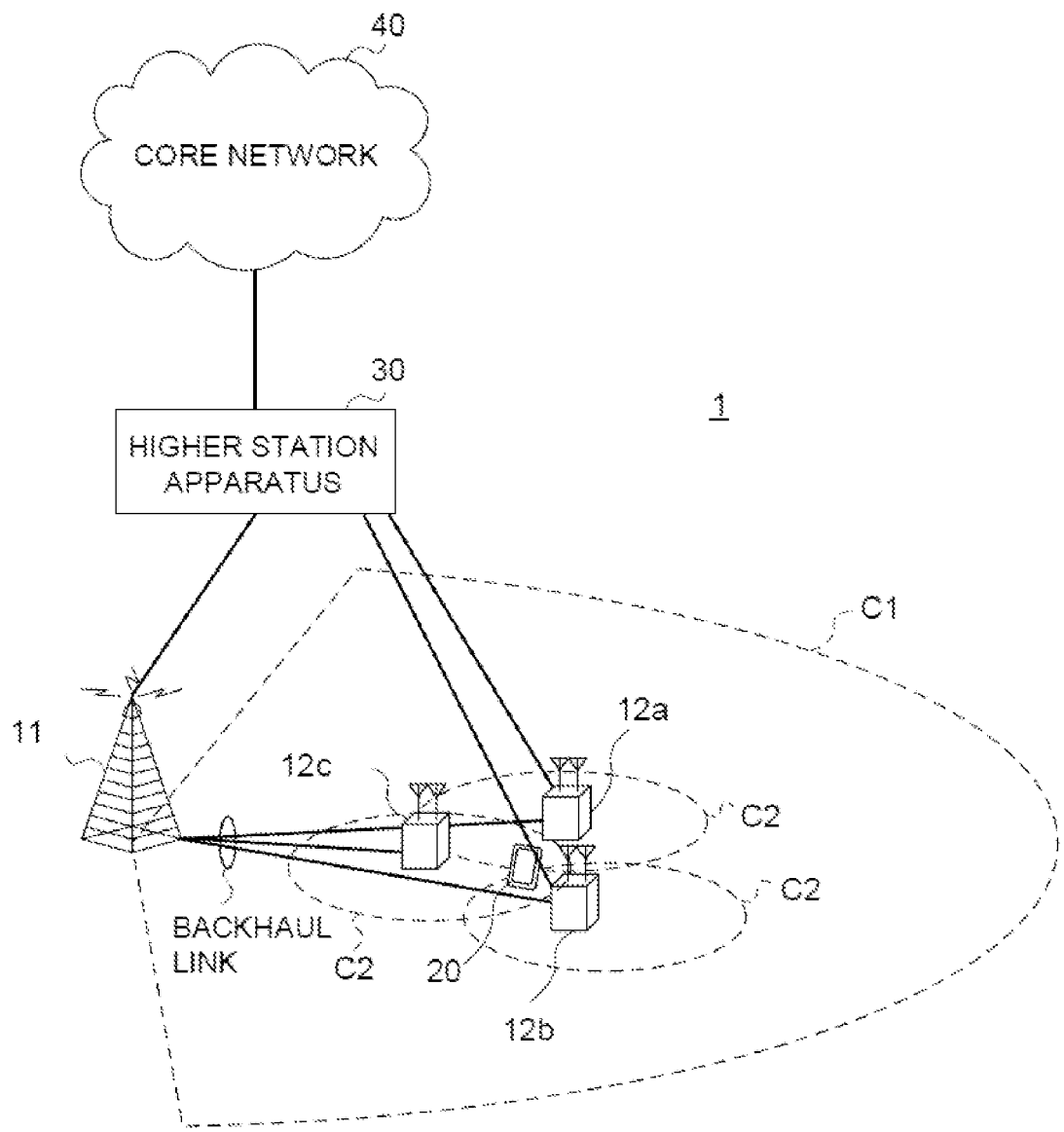
FIG. 7 is a diagram illustrating one example of a schematic configuration of a radio communication system according to the present embodiment.

FIG. 7 is a diagram illustrating one example of a schematic configuration of the radio communication system according to the present embodiment. A radio communication system 1 can apply Carrier Aggregation (CA) and/or Dual Connectivity (DC) that aggregate a plurality of base frequency blocks (component carriers) whose one unit is a system bandwidth (e.g., 20 MHz) of the LTE system. In this regard, the radio communication system 1 may be referred to as SUPER 3G, LTE-Advanced (LTE-A), IMT-Advanced, 4G, 5G, Future Radio Access (FRA) and New-RAT (NR).

The radio communication system 1 illustrated in FIG. 7 includes a radio base station 11 that forms a macro cell C1, and radio base stations 12a to 12c that are located in the macro cell C1 and form small cells C2 narrower than the macro cell C1. Furthermore, a user terminal 20 is located in the macro cell C1 and each small cell C2. Different numerologies may be configured to be applied between cells. In addition, the numerologies refer to a communication parameter set that characterizes a signal design of a certain RAT, and/or an RAT design.

The user terminal 20 can connect with both of the radio base station 11 and the radio base stations 12. The user terminal 20 is assumed to concurrently use the macro cell C1 and the small cells C2 that use different frequencies by CA or DC. Furthermore, the user terminal 20 can apply CA or DC by using a plurality of cells (CCs) (e.g., two CCs or more). Furthermore, the user terminal can use licensed band CCs and unlicensed band CCs as a plurality of cells.

Furthermore, the user terminal 20 can perform communication by using Time Division Duplex (TDD) or Frequency Division Duplex (FDD) in each cell. A TDD cell and an FDD cell may be each referred to as a TDD carrier (frame configuration type 2) and an FDD carrier (frame configuration first type 1).

Furthermore, each cell (carrier) may be applied a subframe (also referred to as a TTI, a general TTI, a long TTI, a general subframe, a long subframe or a slot) having a relatively long time duration (e.g., one ms), or a subframe (also referred to as a short TTI, a short subframe or a slot) having a relatively short time duration, or may be applied both of a long subframe and a short subframe. Furthermore, each cell may be applied a subframe of two or more time durations.

The user terminal 20 and the radio base station 11 can communicate by using a carrier (also referred to as a Legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz, 5 GHz or 30 to 70 GHz) or may use the same carrier as that used between the user terminal 20 and the radio base station 11. In this regard, a configuration of the frequency band used by each radio base station is not limited to this.

The radio base station 11 and each radio base station 12 (or the two radio base stations 12) may be configured to be connected by way of wired connection (e.g., optical fibers compliant with a Common Public Radio Interface (CPRI) or an X2 interface) or by way of radio connection.

The radio base station 11 and each radio base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmission/reception point. Furthermore, each radio base station 12 is a radio base station that has a local coverage, and may be referred to as a small base station, a micro base station, a pico base station, a femto base station, a Home eNodeB (HeNB), a Remote Radio Head (RRH) or a transmission/reception point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal but also a fixed communication terminal. Furthermore, the user terminal 20 can perform device-to-device communication (D2D) with the other user terminal 20.

The radio communication system 1 can apply Orthogonal Frequency-Division Multiple Access (OFDMA) to Downlink (DL), and can apply Single Carrier Frequency Division Multiple Access (SC-FDMA) to Uplink (UL) as radio access schemes. OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into a band including one or contiguous resource blocks per terminal and causes a plurality of terminals to use respectively different bands to reduce an inter-terminal interference. In this regard, uplink and downlink radio access schemes are not limited to a combination of these, and OFDMA may be used on UL. Furthermore, SC-FDMA is applicable to Sidelink (SL) used for device-to-device communication.

The radio communication system 1 uses a DL data channel (PDSCH: Physical Downlink Shared Channel that is also referred to as a DL shared channel) shared by each user terminal 20, a broadcast channel (PBCH: Physical Broadcast Channel) and an L1/L2 control channel as DL channels. At least one of user data, higher layer control information and System Information Blocks (SIBs) is transmitted on the PDSCH. Furthermore, Master Information Blocks (MIBs) are transmitted on the PBCH.

The L1/L2 control channel includes a DL control channel (e.g., a Physical Downlink Control Channel (PDCCH) and/or an Enhanced Physical Downlink Control Channel (EPDCCH)), a Physical Control Format Indicator Channel (PCFICH), and a Physical Hybrid-ARQ Indicator Channel (PHICH). Downlink Control Information (DCI) including scheduling information of the PDSCH and the PUSCH is transmitted on the PDCCH and/or the EPDCCH. The number of OFDM symbols used for the PDCCH is transmitted on the PCFICH. The EPDCCH is subjected to frequency division multiplexing with the PDSCH and is used to transmit DCI similar to the PDCCH. Transmission acknowledgement information (A/N or HARQ-ACK) of the PUSCH can be transmitted on at least one of the PHICH, the PDCCH and the EPDCCH.

The radio communication system 1 uses a UL data channel (PUSCH: Physical Uplink Shared Channel that is also referred to as a UL shared channel) shared by each user terminal 20, a UL control channel (PUCCH: Physical Uplink Control Channel), and a random access channel (PRACH: Physical Random Access Channel) as UL channels. User data and higher layer control information are transmitted on the PUSCH. Uplink Control Information (UCI) including at least one of transmission acknowledgement information (A/N or HARQ-ACK) and Channel State Information (CSI) of the PDSCH is transmitted on the PUSCH or the PUCCH. A random access preamble for establishing connection with a cell can be transmitted on the PRACH.

<Radio Base Station>

Figure 8:
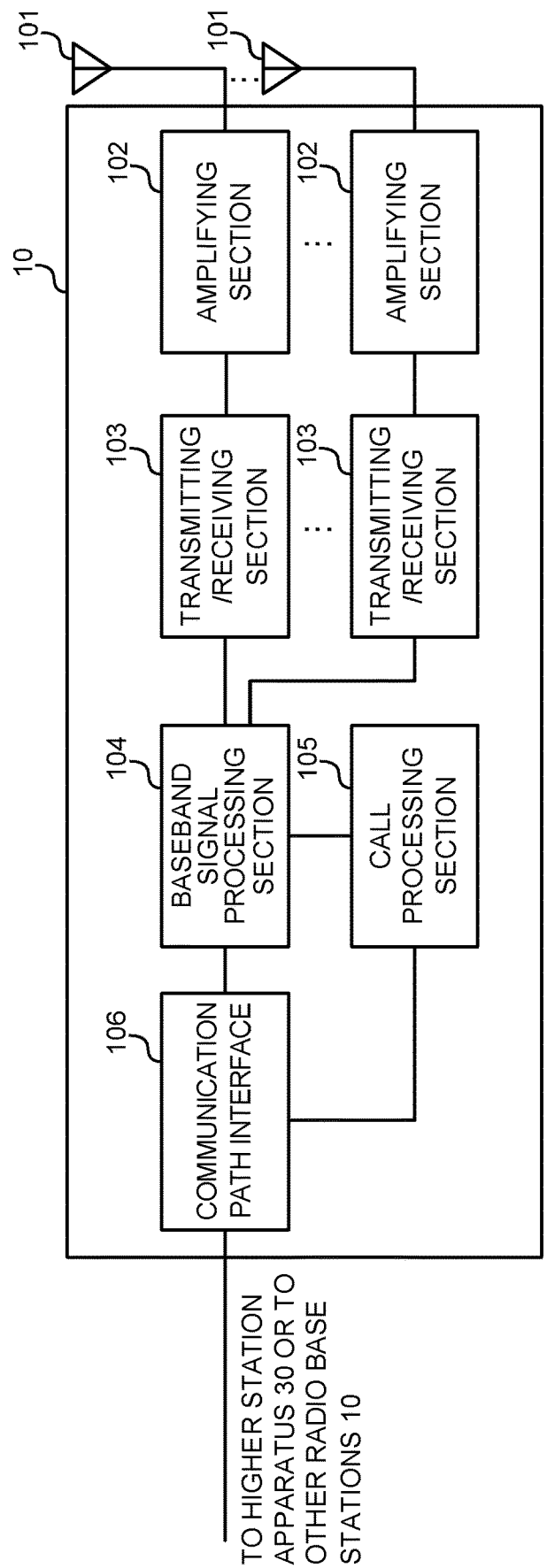
FIG. 8 is a diagram illustrating one example of an overall configuration of a radio base station according to the present embodiment.

FIG. 8 is a diagram illustrating one example of an overall configuration of the radio base station according to the present embodiment. The radio base station 10 includes pluralities of transmission/reception antennas 101, amplifying sections 102 and transmission/reception sections 103, a baseband signal processing section 104, a call processing section 105 and a channel interface 106. In this regard, the radio base station 10 only needs to be configured to include one or more of each of the transmission/reception antennas 101, the amplifying sections 102 and the transmission/reception sections 103.

User data transmitted from the radio base station 10 to the user terminal 20 on downlink is input from the higher station apparatus 30 to the baseband signal processing section 104 via the channel interface 106.

The baseband signal processing section 104 performs processing of a Packet Data Convergence Protocol (PDCP) layer, segmentation and concatenation of the user data, transmission processing of a Radio Link Control (RLC) layer such as RLC retransmission control, Medium Access Control (MAC) retransmission control (e.g., Hybrid Automatic Repeat reQuest (HARM) processing), and transmission processing such as at least one of scheduling, transmission format selection, channel coding, rate matching, scrambling, Inverse Fast Fourier Transform (IFFT) processing, and precoding processing on the user data, and transfers the user data to each transmission/reception section 103. Furthermore, the baseband signal processing section 104 performs transmission processing such as channel coding and/or inverse fast Fourier transform on a downlink control signal, too, and transfers the downlink control signal to each transmission/reception section 103.

Each transmission/reception section 103 converts a baseband signal precoded and output per antenna from the baseband signal processing section 104 into a radio frequency band, and transmits a radio frequency signal. The radio frequency signal subjected to frequency conversion by each transmission/reception section 103 is amplified by each amplifying section 102, and is transmitted from each transmission/reception antenna 101.

The transmission/reception sections 103 can be composed of transmitters/receivers, transmission/reception circuits or transmission/reception apparatuses described based on a common knowledge in a technical field according to the present invention. In this regard, the transmission/reception sections 103 may be composed as an integrated transmission/reception section or may be composed of transmission sections and reception sections.

Meanwhile, each amplifying section 102 amplifies a radio frequency signal received by each transmission/reception antenna 101 as a UL signal. Each transmission/reception section 103 receives the UL signal amplified by each amplifying section 102. Each transmission/reception section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, reception processing of MAC retransmission control, and reception processing of an RLC layer and a PDCP layer on UL data included in the input UL signal, and transfers the UL data to the higher station apparatus 30 via the channel interface 106. The call processing section 105 performs at least one of call processing such as a configuration and release of a communication channel, state management of the radio base station 10, and radio resource management.

The channel interface 106 transmits and receives signals to and from the higher station apparatus 30 via a given interface. Furthermore, the channel interface 106 may transmit and receive (backhaul signaling) signals to and from the neighboring radio base station 10 via an inter-base station interface (e.g., optical fibers compliant with the Common Public Radio Interface (CPRI) or the X2 interface).

Furthermore, each transmission/reception section 103 may receive an uplink signal having a multicarrier (e.g., CP-OFDM) waveform over contiguous frequency resources (e.g., contiguous RBs) by using an uplink shared channel (PUSCH). Furthermore, each transmission/reception section 103 may receive the uplink signal having a single carrier (e.g., DFT-spread-OFDM) waveform over contiguous frequency resources (e.g., contiguous RBs) by using the uplink shared channel.

Furthermore, each transmission/reception section 103 may independently transmit a notification indicating whether frequency hopping is activated or deactivated independently from information indicating which one of the single carrier waveform and the multicarrier waveform is used for the uplink signal. Furthermore, each transmission/reception section 103 may transmit a configuration of higher layer signaling (e.g., a hopping pattern or a hopping offset) and/or an uplink part band (e.g., UL BWP).

Figure 9:
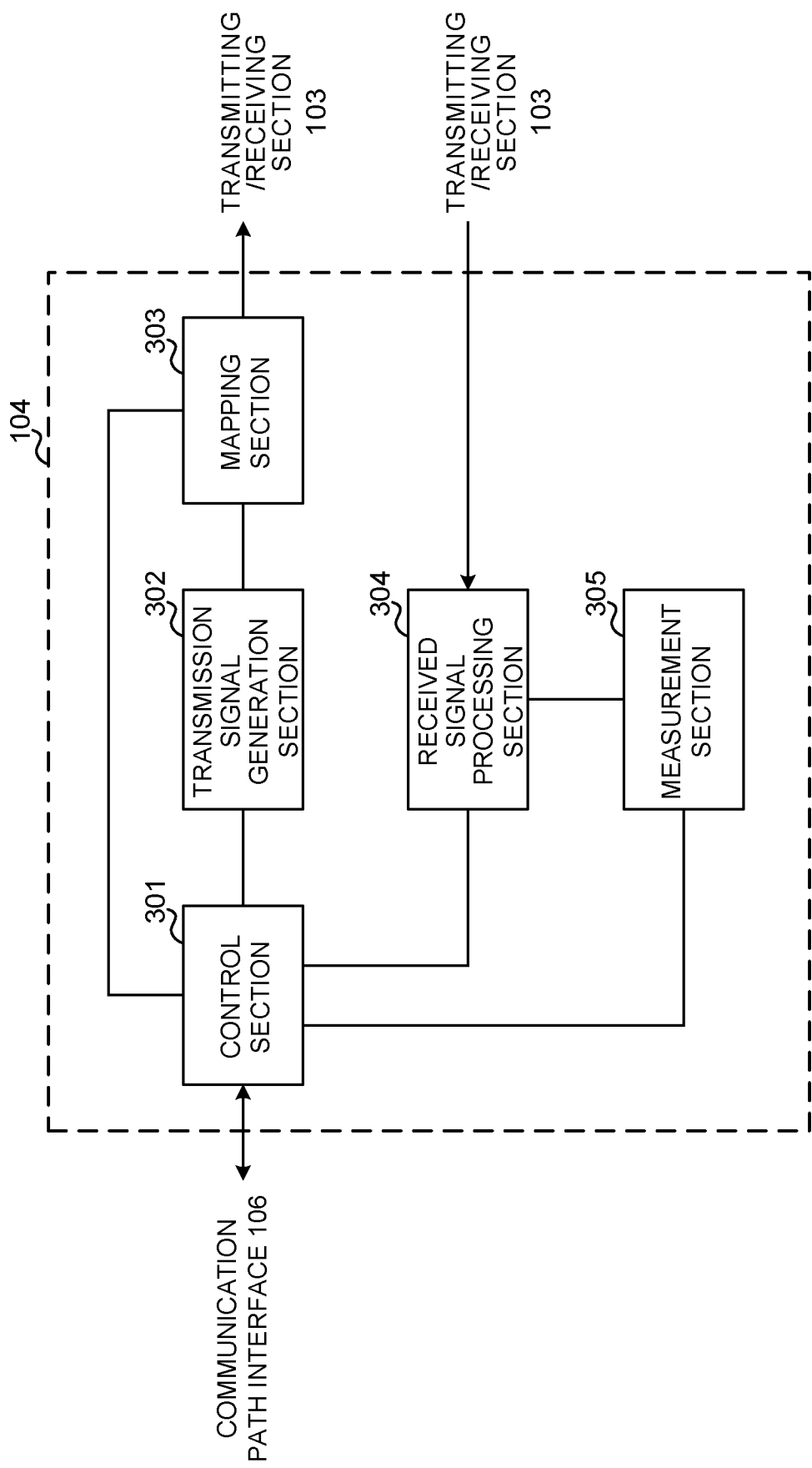
FIG. 9 is a diagram illustrating one example of a function configuration of the radio base station according to the present embodiment.

FIG. 9 is a diagram illustrating one example of a function configuration of the radio base station according to the present embodiment. In addition, FIG. 9 mainly illustrates function blocks of characteristic portions according to the present embodiment, and assumes that the radio base station 10 includes other function blocks, too, that are necessary for radio communication. As illustrated in FIG. 9, the baseband signal processing section 104 includes a control section 301, a transmission signal generating section 302, a mapping section 303, a received signal processing section 304 and a measurement section 305.

The control section 301 controls the entire radio base station 10. The control section 301 controls at least one of, for example, DL signal generation of the transmission signal generating section 302, DL signal mapping of the mapping section 303, UL signal reception processing (e.g., demodulation) of the received signal processing section 304 and measurement of the measurement section 305.

More specifically, the control section 301 schedules the user terminal 20. For example, the control section 301 may perform scheduling and/or retransmission control on DL data and/or UL data channels based on UCI (e.g., CSI) from the user terminal 20. Furthermore, the control section 301 may control a notification of the above PUSCH waveform information and/or a notification indicating whether or not frequency hopping is applied to the UL signal.

The control section 301 can be composed of a controller, a control circuit or a control apparatus described based on the common knowledge in the technical field according to the present invention.

The transmission signal generating section 302 may generate the DL signal (including a DL data signal, a DL control signal and a DL reference signal) based on an instruction from the control section 301, and outputs the DL signal to the mapping section 303.

The transmission signal generating section 302 can be composed of a signal generator, a signal generating circuit or a signal generating apparatus described based on the common knowledge in the technical field according to the present invention.

The mapping section 303 maps the DL signal generated by the transmission signal generating section 302, on a given radio resource based on the instruction from the control section 301, and outputs the DL signal to each transmission/reception section 103. The mapping section 303 can be composed of a mapper, a mapping circuit or a mapping apparatus described based on the common knowledge in the technical field according to the present invention.

The received signal processing section 304 performs reception processing (e.g., demapping, demodulation and decoding) on UL signals (including, for example, a UL data signal, a UL control signal and a UL reference signal) transmitted from the user terminal 20. More specifically, the received signal processing section 304 may output the received signal and/or the signal after reception processing to the measurement section 305. Furthermore, the received signal processing section 304 performs UCI reception processing based on a UL control channel configuration instructed by the control section 301.

The measurement section 305 performs measurement related to the received signal. The measurement section 305 can be composed of a measurement instrument, a measurement circuit or a measurement apparatus described based on the common knowledge in the technical field according to the present invention.

The measurement section 305 may measure UL channel quality based on, for example, received power (e.g., Reference Signal Received Power (RSRP)) and/or received quality (e.g., Reference Signal Received Quality (RSRQ)) of a UL reference signal. The measurement section 305 may output a measurement result to the control section 301.

<User Terminal>

Figure 10:
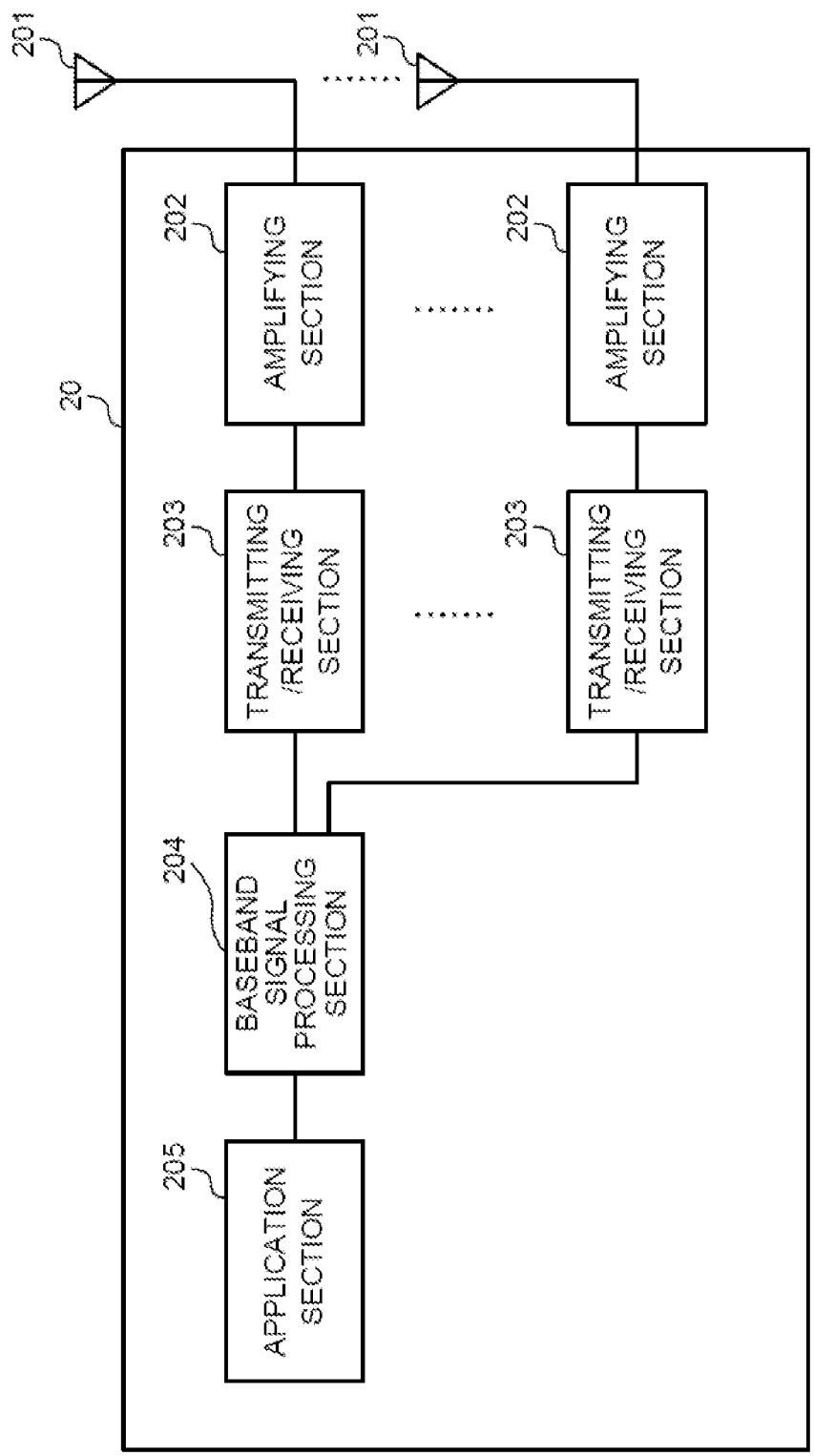
FIG. 10 is a diagram illustrating one example of an overall configuration of a user terminal according to the present embodiment.

FIG. 10 is a diagram illustrating one example of an overall configuration of the user terminal according to the present embodiment. The user terminal 20 includes pluralities of transmission/reception antennas 201 for MIMO transmission, amplifying sections 202 and transmission/reception sections 203, a baseband signal processing section 204 and an application section 205.

The respective amplifying sections 202 amplify radio frequency signals received at a plurality of transmission/reception antennas 201. Each transmission/reception section 203 receives a DL signal amplified by each amplifying section 202. Each transmission/reception section 203 performs frequency conversion on the received signal into a baseband signal, and outputs the baseband signal to the baseband signal processing section 204.

The baseband signal processing section 204 performs at least one of FFT processing, error correcting decoding, and reception processing of retransmission control on the input baseband signal. The baseband signal processing section 204 transfers DL data to the application section 205. The application section 205 performs processing related to layers higher than a physical layer and an MAC layer.

On the other hand, the application section 205 inputs UL data to the baseband signal processing section 204. The baseband signal processing section 204 performs at least one of retransmission control processing (e.g., HARQ processing), channel coding, rate matching, puncturing, Discrete Fourier Transform (DFT) processing and IFFT processing on the UL data, and transfers the UL data to each transmission/reception section 203. UCI (e.g., at least one of A/N of a DL signal, Channel State Information (CSI) and a Scheduling Request (SR)) is also subjected to at least one of channel coding, rate matching, puncturing, DFT processing and IFFT processing, and is transferred to each transmission/reception section 203.

Each transmission/reception section 203 converts the baseband signal output from the baseband signal processing section 204 into a radio frequency band, and transmits a radio frequency signal. The radio frequency signal subjected to the frequency conversion by each transmission/reception section 203 is amplified by each amplifying section 202, and is transmitted from each transmission/reception antenna 201.

Furthermore, each transmission/reception section 203 may transmit an uplink signal having a multicarrier (e.g., CP-OFDM) waveform over contiguous frequency resources (e.g., contiguous RBs) by using an uplink shared channel (PUSCH). Furthermore, each transmission/reception section 203 may transmit an uplink signal having a single carrier (e.g., DFT-spread-OFDM) waveform over contiguous frequency resources (e.g., contiguous RBs) by using the uplink shared channel.

Furthermore, each transmission/reception section 203 may receive the notification indicating whether or not frequency hopping is activated or deactivated independently from information indicating which one of the single carrier and the multicarrier waveform is used for the uplink signal. Furthermore, each transmission/reception section 203 may receive a configuration of higher layer signaling (e.g., the hopping pattern or the hopping offset) and/or the uplink part band (e.g., UL BWP).

The transmission/reception sections 203 can be composed of transmitters/receivers, transmission/reception circuits or transmission/reception apparatuses described based on the common knowledge in the technical field according to the present invention. Furthermore, the transmission/reception sections 203 may be composed as an integrated transmission/reception section or may be composed of transmission sections and reception sections.

Figure 11:
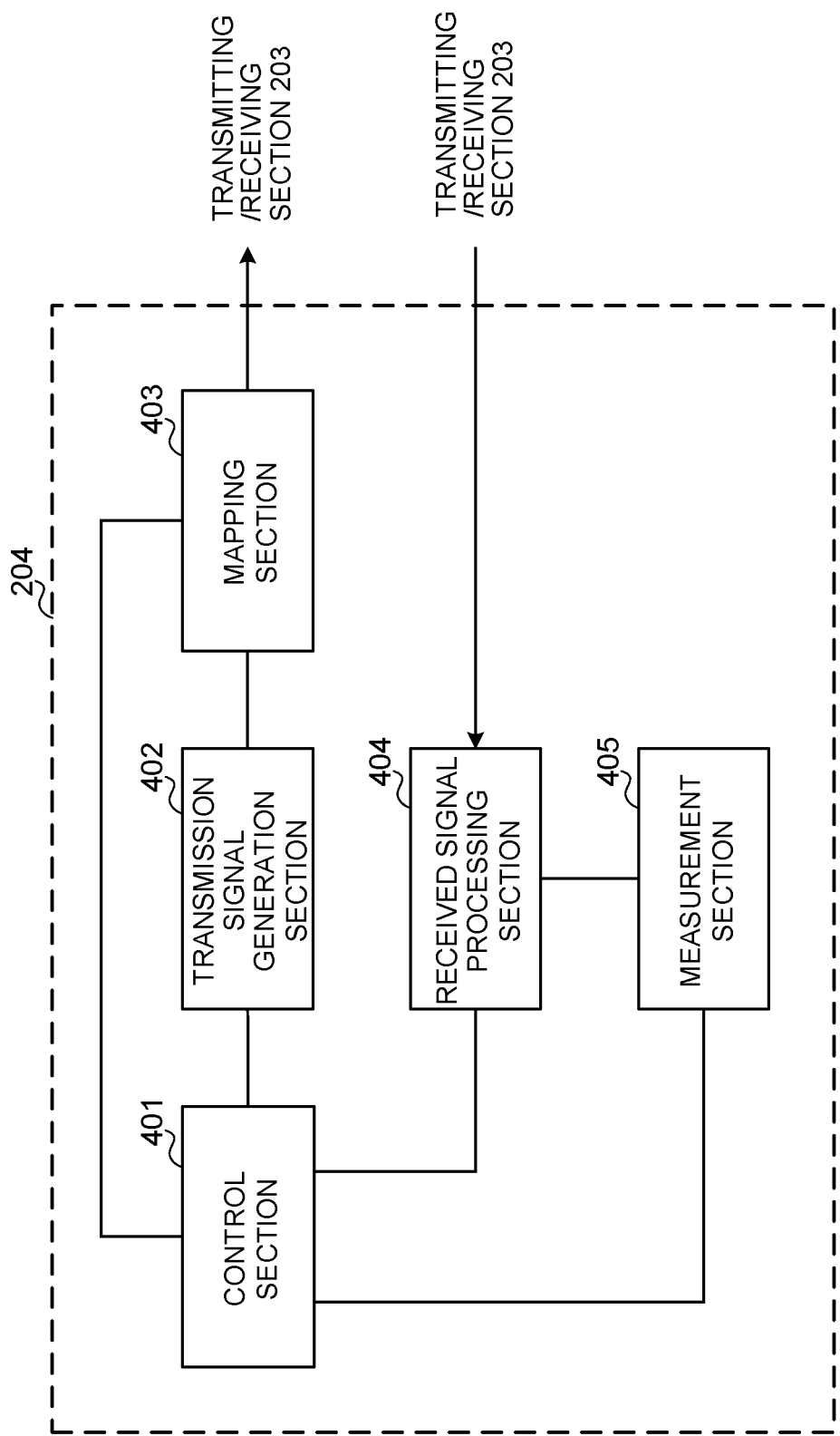
FIG. 11 is a diagram illustrating one example of a function configuration of the user terminal according to the present embodiment.

FIG. 11 is a diagram illustrating one example of a function configuration of the user terminal according to the present embodiment. In addition, FIG. 11 mainly illustrates function blocks of characteristic portions according to the present embodiment, and assumes that the user terminal 20 includes other function blocks, too, that are necessary for radio communication. As illustrated in FIG. 11, the baseband signal processing section 204 of the user terminal 20 includes a control section 401, a transmission signal generating section 402, a mapping section 403, a received signal processing section 404 and a measurement section 405.

The control section 401 controls the entire user terminal 20. The control section 401 controls at least one of, for example, UL signal generation of the transmission signal generating section 402, UL signal mapping of the mapping section 403, DL signal reception processing of the received signal processing section 404, and measurement of the measurement section 405.

Furthermore, the control section 401 may control frequency hopping of an uplink signal.

Furthermore, the control section 401 may control the frequency hopping based on the notification indicating whether or not the frequency hopping is activated or deactivated.

Furthermore, the control section 401 may map (e.g., time-first/frequency second mapping) the uplink signal on a resource of an uplink shared channel in the time direction prior to the frequency direction.

Furthermore, the control section 401 may control frequency hopping over a plurality of transmission time intervals (e.g., TTIs, slots or mini slots).

Furthermore, the control section 401 may determine a transition destination frequency resource of the frequency hopping based on the configuration of the higher layer signaling or the uplink part band.

The control section 401 can be composed of a controller, a control circuit or a control apparatus described based on the common knowledge in the technical field according to the present invention.

The transmission signal generating section 402 generates (e.g., encodes, rate-matches, punctures and modulates) the UL signal (including a UL data signal, a UL control signal, a UL reference signal and UCI) based on an instruction from the control section 401, and outputs the UL signal to the mapping section 403. The transmission signal generating section 402 can be composed of a signal generator, a signal generating circuit or a signal generating apparatus described based on the common knowledge in the technical field according to the present invention.

The mapping section 403 maps the UL signal generated by the transmission signal generating section 402, on a radio resource based on the instruction from the control section 401, and outputs the UL signal to each transmission/reception section 203. The mapping section 403 can be composed of a mapper, a mapping circuit or a mapping apparatus described based on the common knowledge in the technical field according to the present invention.

The received signal processing section 404 performs reception processing (e.g., demapping, demodulation and decoding) on the DL signals (a DL data signal, scheduling information, a DL control signal and a DL reference signal). The received signal processing section 404 outputs information received from the radio base station 10 to the control section 401. The received signal processing section 404 outputs, for example, broadcast information, system information, higher layer control information of higher layer signaling such as RRC signaling, and physical layer control information (L1/L2 control information) to the control section 401.

The received signal processing section 404 can be composed of a signal processor, a signal processing circuit or a signal processing apparatus described based on the common knowledge in the technical field according to the present invention. Furthermore, the received signal processing section 404 can compose the reception section according to the present invention.

The measurement section 405 measures a channel state based on a reference signal (e.g., CSI-RS) from the radio base station 10, and outputs a measurement result to the control section 401. In addition, the channel state may be measured per CC.

The measurement section 405 can be composed of a signal processor, a signal processing circuit or a signal processing apparatus, and a measurement instrument, a measurement circuit or a measurement apparatus described based on the common knowledge in the technical field according to the present invention.

<Hardware Configuration>

In addition, the block diagrams used to describe the above embodiments illustrate blocks in function units. These function blocks (components) are realized by an optional combination of hardware and/or software. Furthermore, a method for realizing each function block is not limited in particular. That is, each function block may be realized by using one physically and/or logically coupled apparatus or may be realized by using a plurality of these apparatuses formed by connecting two or more physically and/or logically separate apparatuses directly and/or indirectly (by using, for example, wired connection and/or radio connection).

Figure 12:
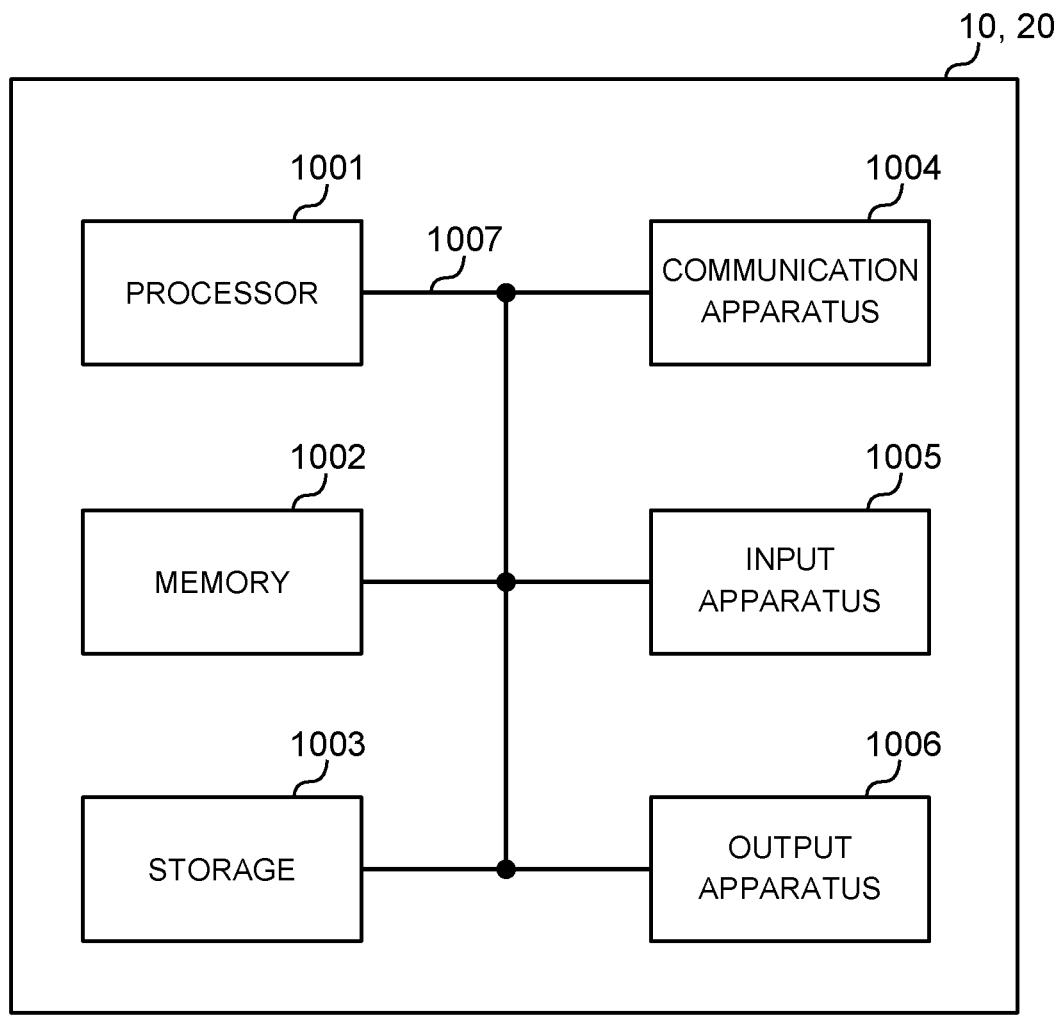
FIG. 12 is a diagram illustrating one example of hardware configurations of the radio base station and the user terminal according to the present embodiment.

For example, the radio base station and the user terminal according to the present embodiment may function as computers that perform processing of the radio communication method according to the present invention. FIG. 12 is a diagram illustrating one example of the hardware configurations of the radio base station and the user terminal according to the present embodiment. The above radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 12 or may be configured without including part of the apparatuses.

For example, FIG. 12 illustrates the only one processor 1001. However, there may be a plurality of processors. Furthermore, processing may be executed by one processor or may be executed by one or more processors concurrently, successively or by using another method. In addition, the processor 1001 may be implemented by one or more chips.

Each function of the radio base station 10 and the user terminal 20 is realized by, for example, causing hardware such as the processor 1001 and the memory 1002 to read given software (program), and thereby causing the processor 1001 to perform an operation, and control communication via the communication apparatus 1004 and reading and/or writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above embodiments are used. For example, the control section 401 of the user terminal 20 may be realized by a control program stored in the memory 1002 and operating on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to carry out the radio communication method according to the present embodiment.

The storage 1003 is a computer-readable recording medium and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via a wired and/or radio network, and is also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above transmission/reception antennas 101 (201), amplifying sections 102 (202), transmission/reception sections 103 (203) and channel interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 and the memory 1002 is connected by the bus 1007 that communicates information. The bus 1007 may be composed by using a single bus or may be composed by using buses that are different between apparatuses.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or all of each function block. For example, the processor 1001 may be implemented by using at least one of these types of hardware.

Modified Example

In addition, each term that has been described in this description and/or each term that is necessary to understand this description may be replaced with terms having identical or similar meanings. For example, a channel and/or a symbol may be signals (signaling). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of periods (frames) in a time domain. Each of one or a plurality of periods (frames) that composes a radio frame may be referred to as a subframe. Furthermore, the subframe may include one or a plurality of slots in the time domain. The subframe may be a fixed time duration (e.g., one ms) that does not depend on the numerologies.

Furthermore, the slot may include one or a plurality of symbols (Orthogonal Frequency Division Multiplexing (OFDM) symbols or Single Carrier Frequency Division Multiple Access (SC-FDMA) symbols) in the time domain. Furthermore, the slot may be a time unit based on the numerologies. Furthermore, the slot may include a plurality of mini slots. Each mini slot may include one or a plurality of symbols in the time domain. Furthermore, a mini slot may be referred to as a sub slot.

The radio frame, the subframe, the slot, the mini slot and the symbol each indicate a time unit for transmitting signals. The other corresponding names may be used for the radio frame, the subframe, the slot, the mini slot and the symbol. For example, one subframe may be referred to as a Transmission Time Interval (TTI), a plurality of contiguous subframes may be referred to as TTIs, or one slot or one mini slot may be referred to as a TTI. That is, the subframe and/or the TTI may be a subframe (one ms) according to legacy LTE, may be a period (e.g., 1 to 13 symbols) shorter than one ms or may be a period longer than one ms. In addition, a unit that indicates a TTI may be referred to as a slot or a mini slot instead of the subframe.

In this regard, the TTI refers to, for example, a minimum time unit of scheduling for radio communication. For example, in the LTE system, the radio base station performs scheduling for allocating radio resources (a frequency bandwidth and transmission power that can be used by each user terminal) in TTI units to each user terminal. In this regard, a definition of the TTI is not limited to this.

The TTI may be a transmission time unit of a channel-coded data packet (transport block), code block and/or code word or may be a processing unit of scheduling and/or link adaptation. In addition, when the TTI is given, a time interval (e.g., the number of symbols) in which a transport block, a code block and/or a code word are actually mapped may be shorter than the TTI.

In addition, when one slot or one mini slot is referred to as a TTI, one or more TTIs (i.e., one or more slots or one or more mini slots) may be a minimum time unit of scheduling. Furthermore, the number of slots (the number of mini slots) that compose a minimum time unit of the scheduling may be controlled.

The TTI having the time duration of one ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe, a short subframe, a mini slot or a subslot.

In addition, the long TTI (e.g., the general TTI or the subframe) may be read as a TTI having a time duration exceeding one ms, and the short TTI (e.g., the reduced TTI) may be read as a TTI having a TTI length less than the TTI length of the long TTI and equal to or more than one ms.

Resource Blocks (RBs) are resource allocation units of the time domain and the frequency domain, and may include one or a plurality of contiguous subcarriers in the frequency domain. Furthermore, the RB may include one or a plurality of symbols in the time domain or may have the length of one slot, one mini slot, one subframe or one TTI. One TTI or one subframe may be each composed of one or a plurality of resource blocks. In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may be composed of one or a plurality of Resource Elements (REs). For example, one RE may be a radio resource domain of one subcarrier and one symbol.

In this regard, structures of the above radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and parameters described in this description may be expressed by using absolute values, may be expressed by using relative values with respect to given values or may be expressed by using other corresponding information. For example, a radio resource may be instructed by a given index.

Names used for parameters in this description are by no means restrictive names. For example, various channels (the Physical Uplink Control Channel (PUCCH) and the Physical Downlink Control Channel (PDCCH)) and information elements can be identified based on various suitable names. Therefore, various names assigned to these various channels and information elements are by no means restrictive names.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by using a management table. The input and output information and signals can be overwritten, updated or additionally written. The output information and signals may be deleted. The input information and signals may be transmitted to other apparatuses.

Notification of information is not limited to the aspects/embodiments described in this description and may be performed by using other methods. For example, the information may be notified by physical layer signaling (e.g., Downlink Control Information (DCI) and Uplink Control Information (UCI)), higher layer signaling (e.g., Radio Resource Control (RRC) signaling, broadcast information (Master Information Blocks (MIBs) and System Information Blocks (SIBs)), and Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") may be made not only explicitly but also implicitly (by, for example, not notifying this given information or by notifying another information).

Decision may be made based on a value (0 or 1) expressed by one bit, may be made based on a boolean expressed by true or false or may be made by comparing numerical values (e.g., comparison with a given value).

Irrespectively of whether software is referred to as software, firmware, middleware, a microcode or a hardware description language or as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using wired techniques (e.g., coaxial cables, optical fiber cables, twisted pairs and Digital Subscriber Lines (DSL)) and/or radio techniques (e.g., infrared rays and microwaves), these wired techniques and/or radio technique are included in a definition of the transmission media.

The terms "system" and "network" used in this description are compatibly used.

In this description, the terms "Base Station (BS)", "radio base station", "eNB", "gNB", "cell", "sector", "cell group", "carrier" and "component carrier" can be compatibly used. The base station is also referred to as a term such as a fixed station, a NodeB, an eNodeB (eNB), an access point, a transmission point, a reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can provide communication service via a base station subsystem (e.g., indoor small base station (RRH: Remote Radio Head)). The term "cell" or "sector" indicates part or the entirety of the coverage area of the base station and/or the base station subsystem that provide communication service in this coverage.

In this description, the terms "Mobile Station (MS)", "user terminal", "User Equipment (UE)" and "terminal" can be compatibly used. The base station is also referred to as a term such as a fixed station, a NodeB, an eNodeB (eNB), an access point, a transmission point, a reception point, a femtocell or a small cell in some cases.

The mobile station is also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

Furthermore, the radio base station in this description may be read as the user terminal. For example, each aspect/embodiment of the present invention may be applied to a configuration where communication between the radio base station and the user terminal is replaced with communication between a plurality of user terminals (D2D: Device-to-Device). In this case, the user terminal 20 may be configured to include the functions of the above radio base station 10. Furthermore, words such as "uplink" and/or "downlink" may be read as "sides". For example, the uplink channel may be read as a side channel.

Similarly, the user terminal in this description may be read as the radio base station. In this case, the radio base station 10 may be configured to include the functions of the above user terminal 20.

In this description, operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MME) or Serving-Gateways (S-GW) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" calculating, computing, processing, deriving, investigating, looking up (e.g., looking up in a table, a database or another data structure) and ascertaining. Furthermore, "deciding (determining)" may be regarded to "decide (determine)" receiving (e.g., receiving information), transmitting (e.g., transmitting information), input, output and accessing (e.g., accessing data in a memory). Furthermore, "deciding (determining)" may be regarded to "decide (determine)" resolving, selecting, choosing, establishing and comparing. That is, "deciding (determining)" may be regarded to "decide (determine)" some operation.

The words "connected" and "coupled" used in this description or every modification of these words can mean every direct or indirect connection or coupling between two or more elements, and can include that one or more intermediate elements exist between the two elements "connected" or "coupled" with each other. The elements may be coupled or connected physically, logically or by way of a combination of physical and logical connections. For example, "connection" may be read as "access".

It can be understood that, when connected in this description, the two elements are "connected" or "coupled" with each other by using one or more electric wires, cables and/or printed electrical connection, and by using electromagnetic energy having wavelengths in radio frequency domains, microwave domains and/or (both of visible and invisible) light domains in some non-restrictive and incomprehensive examples.

A sentence that "A and B are different" in this description may mean that "A and B are different from each other". Words such as "separate" and "coupled" may be also interpreted in a similar manner.

When the words "including" and "comprising" and modifications of these words are used in this description or the claims, these words intend to be comprehensive similar to the word "having". Furthermore, the word "or" used in this description or the claims intends not to be an exclusive OR.

The present invention has been described in detail above. However, it is obvious for a person skilled in the art that the present invention is not limited to the embodiments described in this description. The present invention can be carried out as modified and changed aspects without departing from the gist and the scope of the present invention defined based on the recitation of the claims. Accordingly, the disclosure of this description intends for exemplary explanation, and does not have any restrictive meaning to the present invention.

The invention claimed is:

1. A terminal comprising:
   a processor that determines an offset for a second frequency hop in a frequency hopping on an uplink shared channel based on an uplink Bandwidth Part (UL BWP) configuration; and
   a transmitter that transmits the uplink shared channel,
   wherein the UL BWP configuration includes information indicating a number of physical resource blocks (PRBs) in the UL BWP, and
   the processor performs the frequency hopping in two halves of one slot, a first half of the one slot corresponding to a first hop in the uplink shared channel and a second half of the one slot corresponding to the second hop.

2. The terminal according to claim 1, wherein the processor determines whether to perform the frequency hopping on the uplink shared channel based on an uplink (UL) grant for the uplink shared channel.

3. The terminal according to claim 2, wherein the processor determines whether to perform the frequency hopping, based on the UL grant, regardless of whether a discrete Fourier transform spread is applied to the uplink shared channel.

4. The terminal according to claim 1, wherein the processor performs the frequency hopping between seven symbols of the first half of the one slot in the uplink shared channel and seven symbols of the second half of the one slot.

5. The terminal according to claim 1, wherein the processor performs inter-slot frequency hopping on the uplink shared channel transmission over a plurality of slots.

6. The terminal according to claim 1, wherein the uplink shared channel is allocated to consecutive resource blocks in the UL BWP.

7. The terminal according to claim 6,
wherein the processor determines the frequency offset based on the number of PRBs of the UL BWP when the uplink shared channel is scheduled by a downlink control information, and
wherein the processor determines the frequency offset based on the number of PRBs of the UL BWP when the uplink shared channel is configured by radio resource control (RRC) and is based on layer 1 (L1) signaling based on activation or deactivation.

8. The terminal according to claim 2, wherein the processor performs inter-slot frequency hopping on the uplink shared channel transmission over a plurality of slots.

9. The terminal according to claim 3, wherein the processor performs inter-slot frequency hopping on the uplink shared channel transmission over a plurality of slots.

10. The terminal according to claim 4, wherein the processor performs inter-slot frequency hopping on the uplink shared channel transmission over a plurality of slots.

11. The terminal according to claim 2, wherein the uplink shared channel is allocated to consecutive resource blocks in the UL BWP.

12. The terminal according to claim 3, wherein the uplink shared channel is allocated to consecutive resource blocks in the UL BWP.

13. The terminal according to claim 4, wherein the uplink shared channel is allocated to consecutive resource blocks in the UL BWP.

14. A base station comprising:
a processor that determines an offset for a second frequency hop in a frequency hopping on an uplink shared channel based on an uplink Bandwidth Part (UL BWP) configuration; and
a receiver that receives the uplink shared channel,
wherein the UL BWP configuration includes information indicating a number of physical resource blocks (PRBs) in the UL BWP, and
the frequency hopping is performed in two halves of one slot, a first half of the one slot corresponding to a first hop in the uplink shared channel and a second half of the one slot corresponding to the second hop.

15. A radio communication method for a terminal comprising:
determining an offset for a second frequency hop in a frequency hopping on an uplink shared channel based on an uplink Bandwidth Part (UL BWP) configuration; and
transmitting the uplink shared channel,
wherein the UL BWP configuration includes information indicating a number of physical resource blocks (PRBs) in the UL BWP, and
the frequency hopping is performed in two halves of one slot, a first half of the one slot corresponding to a first hop in the uplink shared channel and a second half of the one slot corresponding to the second hop.

16. A system comprising
a terminal that comprises:
a processor that determines an offset for a second frequency hop in a frequency hopping on an uplink shared channel based on an uplink Bandwidth Part (UL BWP) configuration; and
a transmitter that transmits the uplink shared channel; and
a base station that receives the uplink shared channel,
wherein the UL BWP configuration includes information indicating a number of physical resource blocks (PRBs) in the UL BWP, and
the processor performs the frequency hopping in two halves of one slot, a first half of the one slot corresponding to a first hop in the uplink shared channel and a second half of the one slot corresponding to the second hop.

* * * * *